(12) United States Patent
Raffle et al.

(10) Patent No.: US 9,128,522 B2
(45) Date of Patent: Sep. 8, 2015

(54) WINK GESTURE INPUT FOR A HEAD-MOUNTABLE DEVICE

(75) Inventors: Hayes Solos Raffle, Palo Alto, CA (US); Michael Patrick Johnson, Sunnyvale, CA (US); David Sparks, Cupertino, CA (US); Bo Wu, Alhambra, CA (US)

(73) Assignee: Google Inc., Mountain View, CA (US)

(*) Notice: Subject to any disclaimer, the term of this patent is extended or adjusted under 35 U.S.C. 154(b) by 283 days.

(21) Appl. No.: 13/550,791

(22) Filed: Jul. 17, 2012

(65) Prior Publication Data

US 2013/0257709 A1    Oct. 3, 2013

Related U.S. Application Data

(60) Provisional application No. 61/619,336, filed on Apr. 2, 2012.

(51) Int. Cl.
*G06F 3/00* (2006.01)
*G06F 3/01* (2006.01)

(52) U.S. Cl.
CPC ..................... *G06F 3/013* (2013.01)

(58) Field of Classification Search
CPC .... G06F 3/011; G02C 11/10; G06K 9/00335; G06K 9/3036
USPC ........... 345/156; 351/209–223; 340/575, 576; 341/20, 21
See application file for complete search history.

(56) References Cited

U.S. PATENT DOCUMENTS

| 4,081,623 | A  | 3/1978 | Vogeley |
| 5,360,971 | A  | 11/1994 | Kaufman |
| 5,570,151 | A  | 10/1996 | Terunuma |
| 5,621,424 | A  | 4/1997 | Shimada |
| 5,926,655 | A  | 7/1999 | Irie |
| 6,542,081 | B2 | 4/2003 | Torch |
| 6,920,283 | B2 | 7/2005 | Goldstein |
| 7,192,136 | B2 | 3/2007 | Howell |

(Continued)

FOREIGN PATENT DOCUMENTS

| JP | 2011221890 | 11/2011 |
| WO | 2011114092 | 9/2011 |

OTHER PUBLICATIONS

Emiliano Miluzzo et al., "EyePhone: Activating Mobile Phones With Your Eyes", MobiHeld 2010 Proceedings of the Second ACM SIGCOMM Workshop on Networking, Systems, and Applications on Mobile Handhelds, Aug. 30, 2010, pp. 15-20, published by Association for Computing Machinery, New York, NY, USA.

(Continued)

*Primary Examiner* — Olga Merkoulova
(74) *Attorney, Agent, or Firm* — McDonnell Boehnen Hulbert & Berghoff LLP (57) ABSTRACT

This disclosure relates to proximity sensing for wink detection. An illustrative method includes receiving data from a receiver portion of a proximity sensor. The receiver portion is disposed at a side section of a head-mountable device (HMD). When a wearer wears the HMD, the receiver portion is arranged to receive light reflected from an eye area of the wearer, the proximity sensor detects a movement of the eye area, and the data represents the movement. The method includes determining that the data corresponds to a wink gesture. The method also includes selecting a computing action to perform, based on the wink gesture. The method further includes performing the computing action.

23 Claims, 7 Drawing Sheets

(56) References Cited

U.S. PATENT DOCUMENTS

| | | | |
|---|---|---|---|
| RE39,539 E | 4/2007 | Torch | |
| 7,255,437 B2 | 8/2007 | Howell | |
| 7,347,551 B2* | 3/2008 | Fergason et al. | 351/210 |
| 7,380,936 B2 | 6/2008 | Howell | |
| 7,401,918 B2 | 7/2008 | Howell | |
| 7,401,920 B1 | 7/2008 | Kranz | |
| 7,438,410 B1 | 10/2008 | Howell | |
| 7,481,531 B2 | 1/2009 | Howell | |
| 7,500,746 B1 | 3/2009 | Howell | |
| 7,500,747 B2 | 3/2009 | Howell | |
| 7,515,054 B2 | 4/2009 | Torch | |
| 7,543,934 B2 | 6/2009 | Howell | |
| 7,581,833 B2 | 9/2009 | Howell | |
| 7,621,634 B2 | 11/2009 | Howell | |
| 7,677,723 B2 | 3/2010 | Howell | |
| RE41,376 E | 6/2010 | Torch | |
| 7,760,898 B2 | 7/2010 | Howell | |
| 7,762,665 B2 | 7/2010 | Vertegaal | |
| 7,771,046 B2 | 8/2010 | Howell | |
| 7,792,552 B2 | 9/2010 | Thomas | |
| 7,806,525 B2 | 10/2010 | Howell | |
| 7,922,321 B2 | 4/2011 | Howell | |
| 8,073,198 B2 | 12/2011 | Marti | |
| 8,109,629 B2 | 2/2012 | Howell | |
| 8,160,311 B1* | 4/2012 | Schaefer | 382/118 |
| 8,235,529 B1 | 8/2012 | Raffle | |
| 8,363,098 B2 | 1/2013 | Rosener | |
| 8,428,053 B2 | 4/2013 | Kannappan | |
| 8,723,790 B1* | 5/2014 | Schaefer | 345/156 |
| 2001/0028309 A1* | 10/2001 | Torch | 340/575 |
| 2004/0183749 A1 | 9/2004 | Vertegaal | |
| 2005/0007552 A1* | 1/2005 | Fergason et al. | 351/210 |
| 2005/0119642 A1* | 6/2005 | Grecu et al. | 606/5 |
| 2005/0264527 A1 | 12/2005 | Lin | |
| 2006/0103591 A1 | 5/2006 | Tanimura | |
| 2006/0115130 A1 | 6/2006 | Kozlay | |
| 2006/0192775 A1 | 8/2006 | Nicholson | |
| 2007/0024579 A1 | 2/2007 | Rosenberg | |
| 2007/0086764 A1 | 4/2007 | Konicek | |
| 2007/0201847 A1 | 8/2007 | Lei | |
| 2008/0211768 A1 | 9/2008 | Breen | |
| 2009/0115968 A1* | 5/2009 | Sugiyama | 351/221 |
| 2009/0195497 A1 | 8/2009 | Fitzgerald | |
| 2010/0053555 A1* | 3/2010 | Enriquez et al. | 351/210 |
| 2010/0066821 A1 | 3/2010 | Rosener | |
| 2010/0109895 A1 | 5/2010 | Rosener | |
| 2010/0110368 A1 | 5/2010 | Chaum | |
| 2010/0149073 A1* | 6/2010 | Chaum et al. | 345/8 |
| 2010/0235667 A1 | 9/2010 | Mucignat | |
| 2010/0295769 A1 | 11/2010 | Lundstrom | |
| 2011/0092925 A1 | 4/2011 | Voss | |
| 2011/0213664 A1* | 9/2011 | Osterhout et al. | 705/14.58 |
| 2011/0231757 A1 | 9/2011 | Haddick | |
| 2012/0019645 A1 | 1/2012 | Maltz | |
| 2012/0019662 A1 | 1/2012 | Maltz | |
| 2013/0135204 A1 | 5/2013 | Raffle | |
| 2013/0176533 A1 | 7/2013 | Raffle | |
| 2013/0257709 A1 | 10/2013 | Raffle | |
| 2013/0300652 A1 | 11/2013 | Raffle | |

OTHER PUBLICATIONS

Arias, "Relation Between Intensity and Amplitude", Sep. 13, 2001.
Chau et al., "Real Time Eye Tracking and Blink Detection with USB Cameras", Boston University Technical Report No. 2005-12, May 12, 2005.
College of Engineering at the University of Wisconsin, "Device May Help Prevent 'Falling Asleep at the Switch'", Jan. 27, 1997.
Digi-Key Corporation, "Order page for Silicon Laboratories SI1140-A10-GMR", Mar. 15, 2012.
Eizenmann et al., "Precise Non-Contacting Measurement of Eye Movements Using the Corneal Reflex", Vision Research, vol. 24, Issue 2, pp. 167-174, 1984.
Silicon Labs, "Si1102 and Si1120 Designer Guides", Rev. 0.1, Oct. 2009, Silicon Laboratories.
Silicon Labs, "Si1143 Proximity/Ambient Light Sensor with I2C Interface", Nov. 19, 2010, Silicon Laboratories.
Tinker, "Apparatus for Recording Eye-Movements", The American Journal of Psychology, Jan. 1931, pp. 115-118, vol. 43, No. 1, University of Illinois Press.
International Search Report for corresponding international application No. PCT/US2013/034948 mailed Jul. 25, 2013.
Written Opinion for corresponding international application No. PCT/US2013/034948 mailed Jul. 25, 2013.
Pending U.S. Appl. No. 13/550,7558, filed Jul. 16, 2012.
Pending U.S. Appl. No. 13/629,944, filed Sep. 28, 2012.

* cited by examiner

WINK GESTURE INPUT FOR A HEAD-MOUNTABLE DEVICE

CROSS-REFERENCE TO RELATED APPLICATIONS

This application claims the benefit of U.S. Provisional Application No. 61/619,336, filed on Apr. 2, 2012, the entirety of which is incorporated herein by reference.

BACKGROUND

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mountable displays" (HMDs). A head-mountable display places a graphic display or displays close to one or both eyes of a wearer. To generate the images on a display, a computer processing system can be used. Such displays can occupy a wearer's entire field of view, or occupy part of wearer's field of view. Further, head-mountable displays can be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. Nonetheless, often users must carry out complex and/or burdensome input procedures to perform desired computing functions. As a result, known methods for performing computing functions are often considered inconvenient, inefficient, and/or non-intuitive.

SUMMARY

This disclosure provides, in part, a method. The method includes receiving data from a receiver portion of a proximity sensor. The receiver portion is disposed at a side section of a head-mountable device (HMD). When a wearer wears the HMD, the receiver portion is arranged to receive light reflected from an eye area of the wearer, the proximity sensor detects a movement of the eye area, and the data represents the movement. The method also includes determining that the data corresponds to a wink gesture. The method also includes selecting a computing action to perform, based on the wink gesture. The method also includes performing the computing action.

This disclosure also provides, in part, an HMD. The HMD includes a support structure that includes a front section and a side section. The side section is adapted to receive a receiver portion of a proximity sensor such that, when a wearer wears the HMD, (i) the receiver portion is arranged to receive light reflected from an eye area of the wearer and (ii) the proximity sensor is configured to detect a movement of the eye area. The HMD also includes a computer-readable medium. The HMD also includes program instructions that are stored to the computer-readable medium and are executable by at least one processor to perform functions. The functions include receiving data from the receiver portion. When the HMD is worn, the data represents the movement of the eye area. The functions further include determining that the data corresponds to a wink gesture. The functions further include selecting a computing action to perform, based on the wink gesture. The functions further include performing the computing action.

This disclosure also provides, in part, a non-transitory computer-readable medium. The medium has stored thereon program instructions that, upon execution by at least one processor, cause the at least one processor to perform functions, such as, for example, those discussed above in connection with the method.

DETAILED DESCRIPTION

1. Overview

Some implementations in this disclosure relate to detecting a wink of an eye and a direction along which the eye is oriented before, during, or after the wink. This can be accomplished in a head-mountable device (HMD), such as a glasses-style wearable computer, that is equipped with one or more proximity sensors. In some implementations, an HMD has a proximity sensor, which has a receiver portion that is disposed at a side section of the HMD. Accordingly, in these implementations, when a wearer wears the HMD, the receiver portion is arranged at an oblique angle relative to the eye area and can detect light (for example, infrared light) that is reflected from the eye area. In addition, the HMD can include a light source or a set of light sources that is able to provide light (for example, infrared light) to the eye area.

When the wearer's eye changes orientation or closes, the movement of the eyelids can cause changes in the intensity of light that is reflected from the eye area. By tracking the intensity of the reflected light, the system can recognize eye movements and can determine the direction along which the eye is oriented before, during, or after the wink.

In response to a wink gesture, the HMD can select a computing action to perform. Then, the HMD can perform the computing action or can cause a connected system to perform the computing action. In some implementations, the computing action can be selected in response to some wink gestures, but may not be selected in response to other wink gestures. For example, the computing action can be selected in response to a wink gesture that occurs while the eye is oriented along an "on screen" direction, but the computing action may not be selected in response to a wink gesture that occurs while the eye is oriented along an "off screen" direction.

2. Wink-Detection System Architecture a. Computing Systems

Figure 1A:
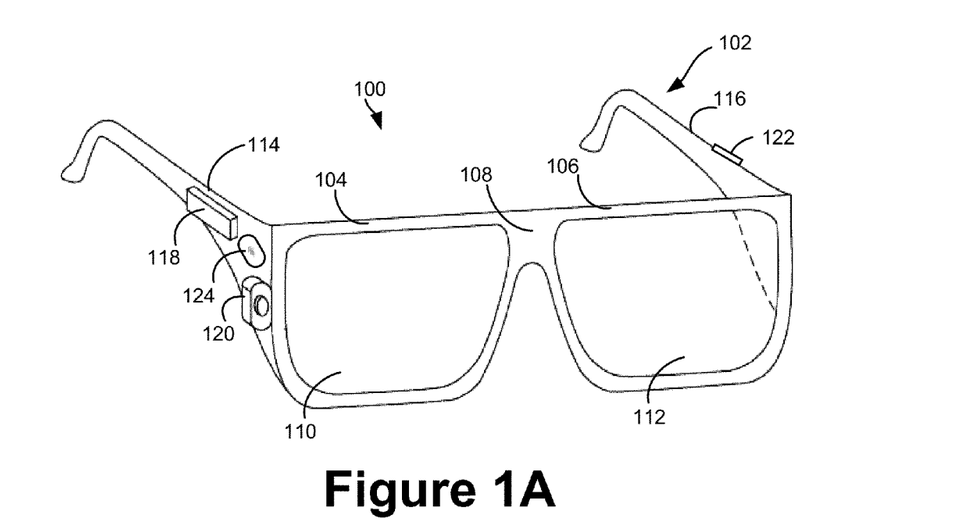
FIGS. 1A and 1B illustrate an example of a wearable computing system.

FIG. 1A illustrates an example of a wearable computing system 100 that includes a wink-detection system 136. While FIG. 1A illustrates a head-mountable device (HMD) 102 as an example of a wearable computing device, other types of wearable computing systems can be used. As illustrated in FIG. 1A, the HMD 102 includes frame elements including lens-frames 104, 106 and a center frame support 108, lens elements 110, 112, and extending side arms 114, 116. The center frame support 108 and the extending side arms 114, 116 are configured to secure the HMD 102 to a wearer's face via the wearer's nose and ears, respectively.

Each of the frame elements 104, 106, and 108 and the extending side arms 114, 116 can be formed of a solid structure of plastic and/or metal, or can be formed of a hollow structure of similar material so as to allow wiring and component interconnects to be internally routed through the HMD 102. Other materials can be used as well.

One or more of each of the lens elements 110, 112 can be formed of any material that can suitably display a projected image or graphic. Each of the lens elements 110, 112 can also be sufficiently transparent to allow a wearer to see through the lens element. Combining these two features of the lens elements can facilitate an augmented reality or heads-up display where the projected image or graphic is superimposed over a real-world view as perceived by the wearer through the lens elements.

The extending side arms 114, 116 can each be projections that extend away from the lens-frames 104, 106, respectively, and can be positioned behind a wearer's ears to secure the head-mountable device 102 to the wearer. The extending side arms 114, 116 can further secure the head-mountable device 102 to the wearer by extending around a rear portion of the wearer's head. Additionally or alternatively, for example, the wearable computing system 100 can connect to or be affixed within a head-mountable helmet structure.

The wearable computing system 100 can include an on-board computing system 118, a video camera 120, a sensor 122, and a finger-operable touch pad 124. The on-board computing system 118 is shown to be positioned on the extending side-arm 114 of the HMD 102; however, the on-board computing system 118 can be provided on other parts of the HMD 102 or can be positioned remote from the HMD 102. The on-board computing system 118 can be wire- or wirelessly-connected to the HMD 102. The on-board computing system 118 can include a processor and memory, for example. The on-board computing system 118 can be configured to receive and analyze data from the video camera 120 and from the finger-operable touch pad 124 (and possibly from other sensory devices, user interfaces, or both) and generate images for output by the lens elements 110 and 112. The on-board computing system 118 can take the form of the computing system 300 discussed below in connection with FIG. 3.

Figure 1B:
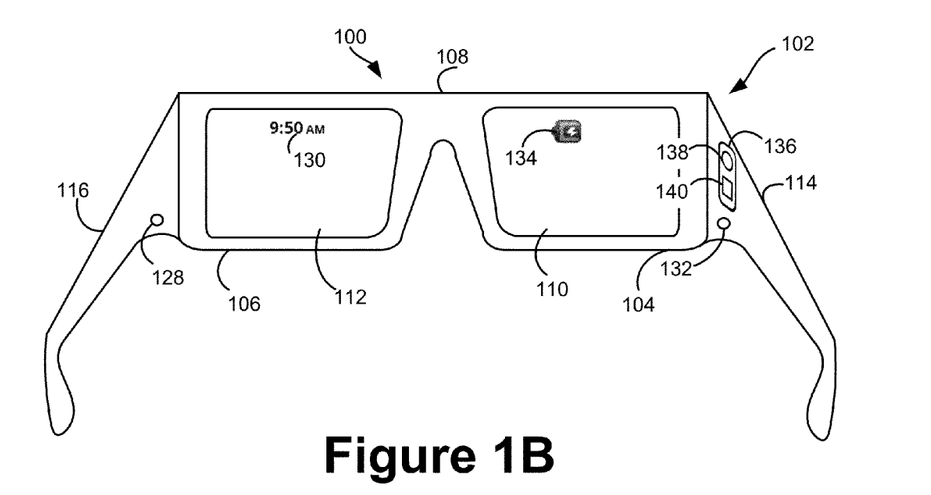

With continued reference to FIGS. 1A-1B, the video camera 120 is shown positioned on the extending side-arm 114 of the HMD 102; however, the video camera 120 can be provided on other parts of the HMD 102. The video camera 120 can be configured to capture images at various resolutions or at different frame rates. Many video cameras with a small form-factor, such as those used in cell phones or webcams, for example, can be incorporated into the wearable computing system 100.

Further, although FIG. 1A illustrates one video camera 120, more video cameras can be used, and each video camera can be configured to capture the same view, or to capture different views. For example, the video camera 120 can be forward facing to capture at least a portion of the real-world view perceived by the wearer. This forward facing image captured by the video camera 120 can then be used to generate an augmented reality in which computer generated images appear to interact with the real-world view perceived by the wearer.

The sensor 122 is shown on the extending side-arm 116 of the HMD 102; however, the sensor 122 can be positioned on other parts of the HMD 102. The sensor 122 can include one or more of a gyroscope, an accelerometer, or a proximity sensor, for example. Other sensing devices can be included within, or in addition to, the sensor 122 or other sensing functions can be performed by the sensor 122.

The finger-operable touch pad 124 is shown on the extending side-arm 114 of the HMD 102. However, the finger-operable touch pad 124 can be positioned on other parts of the HMD 102. Also, more than one finger-operable touch pad can be present on the HMD 102. The finger-operable touch pad 124 can be used by a wearer to input commands. The finger-operable touch pad 124 can sense at least one of a position and a movement of a finger via capacitive sensing, resistance sensing, or a surface acoustic wave process, among other possibilities. The finger-operable touch pad 124 can be capable of sensing finger movement in a direction parallel or planar to the pad surface, in a direction normal to the pad surface, or both, and can also be capable of sensing a level of pressure applied to the pad surface. The finger-operable touch pad 124 can be formed of one or more translucent or transparent insulating layers and one or more translucent or transparent conducting layers. Edges of the finger-operable touch pad 124 can be formed to have a raised, indented, or roughened surface, so as to provide tactile feedback to a wearer when the wearer's finger reaches the edge, or other area, of the finger-operable touch pad 124. If more than one finger-operable touch pad is present, each finger-operable touch pad can be operated independently, and can provide a different function.

FIG. 1B illustrates an alternate view of the wearable computing system 100 illustrated in FIG. 1A. As shown in FIG. 1B, the lens elements 110, 112 can act as display elements. The HMD 102 can include a first projector 128 coupled to an inside surface of the extending side-arm 116 and configured to project a display 130 onto an inside surface of the lens element 112. A second projector 132 can be coupled to an inside surface of the extending side-arm 114 and configured to project a display 134 onto an inside surface of the lens element 110.

The lens elements 110, 112 can act as a combiner in a light projection system and can include a coating that reflects the light projected onto them from the projectors 128, 132. In some embodiments, a reflective coating may not be used, such as, for example, when the projectors 128, 132 are scanning laser devices.

In some embodiments, other types of display elements can also be used. For example, the lens elements 110, 112 themselves can include a transparent or semi-transparent matrix display (such as an electroluminescent display or a liquid crystal display), one or more waveguides for delivering an image to the wearer's eyes, or one or more other optical elements capable of delivering an in focus near-to-eye image to the wearer. A corresponding display driver can be disposed within the frame elements 104, 106 for driving such a matrix display. A laser or LED source and scanning system can be used to draw a raster display directly onto the retina of one or more of the wearer's eyes.

The wink-detection system 136 is shown in FIG. 1B to include a light source 138 and a light sensor 140 affixed to the extending side-arm 114 of the HMD 102. As discussed below in connection with FIG. 2, a wink-detection system can include other numbers of light sources (including no light sources) and can include elements other than those shown in connection with the wink-detection system 136. Additionally, the wink-detection system 136 can be affixed in a variety of other ways. For example, the light source 138 can be mounted separately from the light sensor 140. As another example, the wink-detection system 136 can be mounted to other frame elements of the HMD 102, such as, for example, the lens-frames 104 or 106, center frame support 108, and/or extending side-arm 116.

Figure 1C:
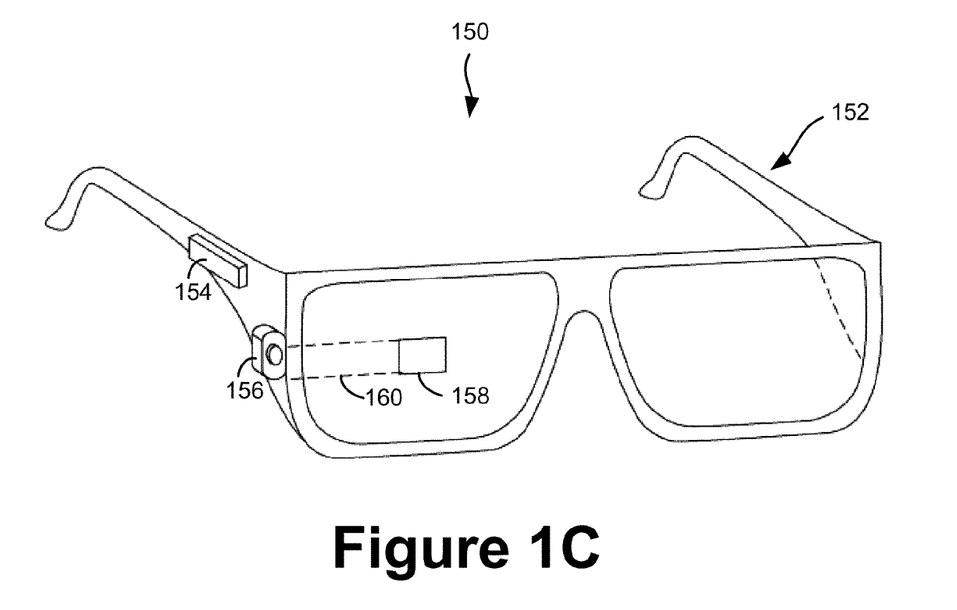
FIG. 1C illustrates another example of a wearable computing system.

FIG. 1C illustrates another example of a wearable computing system 150 that can be coupled to a wink-detection system (not shown in FIG. 1C). While FIG. 1C illustrates an HMD 152 as an example of a wearable computing system, other types of wearable computing systems can be used. The HMD 152 can include frame elements and side arms such as those described above with respect to FIGS. 1A and 1B. The HMD 152 can additionally include an on-board computing system 154 and a video camera 156, such as those described above with respect to FIGS. 1A and 1B. The video camera 156 is shown mounted on a frame of the HMD 152; however, the video camera 156 can be mounted at other positions as well.

As shown in FIG. 1C, the HMD 152 can include a single display 158, which can be coupled to the HMD 152. The display 158 can be formed on one of the lens elements of the HMD 152, such as a lens element described above with respect to FIGS. 1A and 1B, and can be configured to overlay computer-generated graphics in the wearer's view of the physical world. The display 158 is shown to be provided in a center of a lens of the HMD 152; however, the display 158 can be provided in other positions. The display 158 is controllable by way of the computing system 154, which is coupled to the display 158 by way of an optical waveguide 160.

Figure 1D:
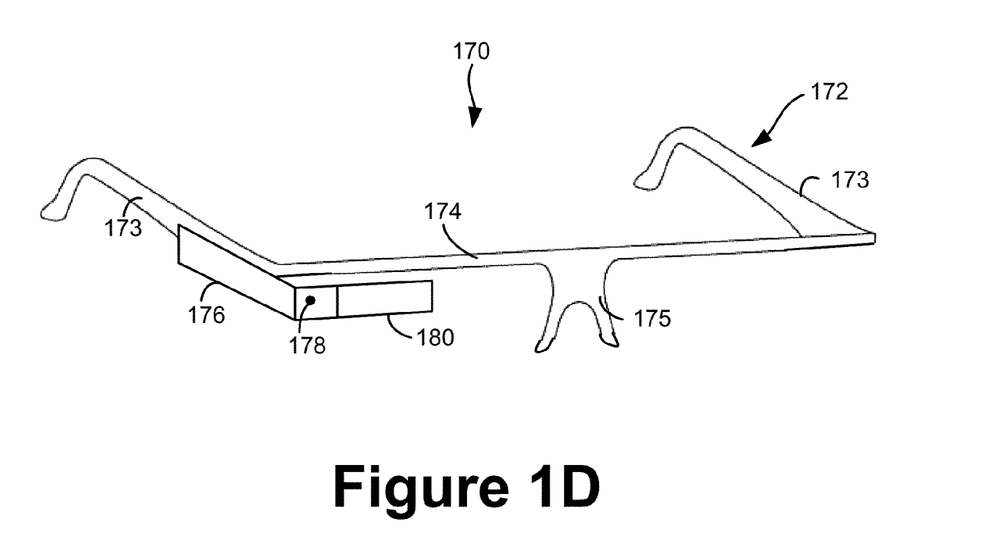
FIG. 1D illustrates another example of a wearable computing system.

FIG. 1D illustrates another example of a wearable computing system 170 that can include or connect to a wink-detection system (not shown in FIG. 1D). The wearable computing system 170 is shown in the form an HMD 172; however, the wearable computing system 170 can take other forms as well. The HMD 172 can include side arms 173, a center frame support 174, and a bridge portion with nosepiece 175. In the example shown in FIG. 1D, the center frame support 174 connects the side arms 173. The HMD 172 does not include lens-frames containing lens elements. The HMD 172 can additionally include an on-board computing system 176 and a video camera 178, such as those described above with respect to FIGS. 1A and 1B.

The HMD 172 can include a single lens element 180 that can be coupled to one of the side arms 173 or the center frame support 174. The lens element 180 can include a display, such as the display described above with reference to FIGS. 1A and 1B, and can be configured to overlay computer-generated graphics upon the wearer's view of the physical world. For example, the single lens element 180 can be coupled to the inner side (the side exposed to a portion of a wearer's head when worn by the wearer) of the extending side-arm 173. The single lens element 180 can be positioned in front of or proximate to a wearer's eye when the wearable computing device 172 is worn. For example, the single lens element 180 can be positioned below the center frame support 174, as shown in FIG. 1D.

b. Wink-Detection System

Figure 2:
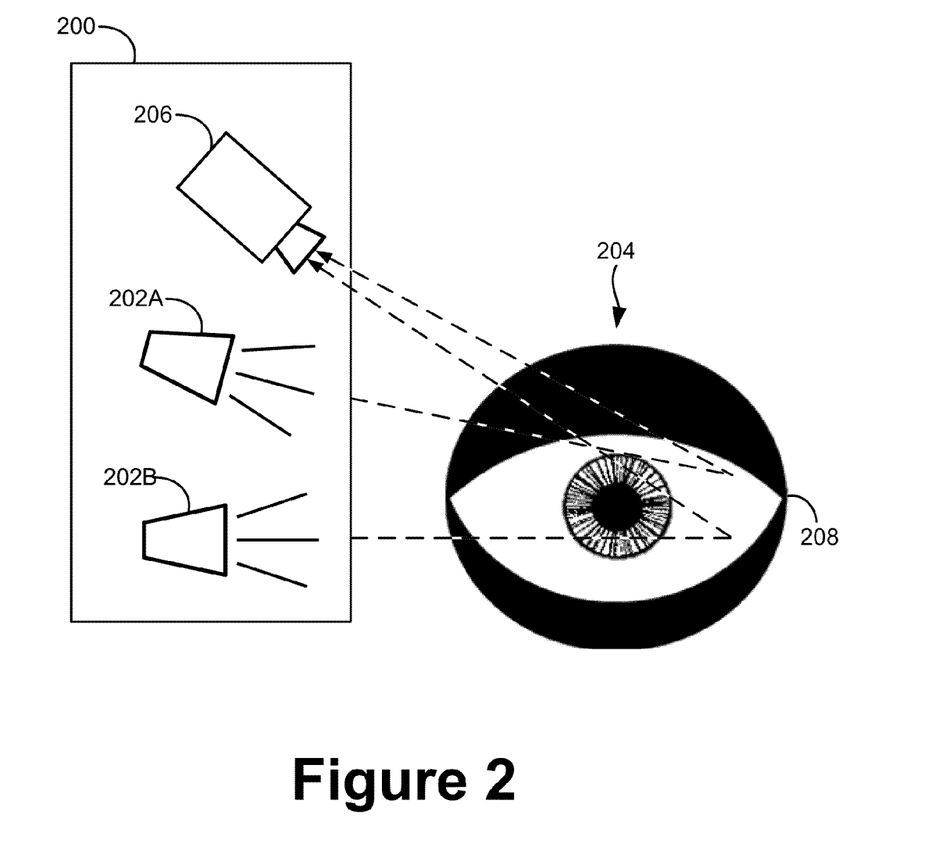
FIG. 2 illustrates an example of a wink-detection system.

FIG. 2 illustrates an example of a wink-detection system 200 interacting with an eye area 204. The eye area 204 can include the eye surface, eyelids, and portions of the face around the eye. The wink-detection system 200 includes two light sources 202A and 202B that are configured to provide light (light shown as dashed lines) to the eye area 204. The wink-detection system 200 also includes a light sensor 206 that is configured to detect reflected light (also shown as dashed lines) from the eye area 204. The wink-detection system 200 can further include a processing unit (not shown in FIG. 2) that can perform computing functions. In particular, the processing unit can drive the light sources 202A-B, receive readings from the light sensor 206, and/or process the readings to determine aspects of the eye area 204, among other functions.

i. Light Sources

In FIG. 2, the system 200 is shown to use two light sources 202A-B to provide light to the eye area 204. While two light sources are shown, the wink-detection system can use any suitable number of light sources to illuminate the eye area. Further, some wink-detection systems may not include light sources at all. Instead, such systems can detect ambient light or other illumination coming from the eye area.

In systems using light sources, the light sources can be any type of light source. For example, the light sources can be light-emitting diodes (LEDs), laser diodes, incandescent sources, and/or gas discharge sources. The light sources can be integrated with the system or externally connected, and can be driven by the light sensor or by a processing unit. The light sources can emit any frequency or intensity of light. In an embodiment, the intensity can be in a range that is safe for the wearer's eye. Additionally, light that is not visible to humans (such as, for example, infrared (IR) light, near-IR, or the like) can be used to avoid irritating the wearer. Some wink-detection systems, however, can use visible light or high-intensity light for detection.

In some embodiments, the light sources can be aimed at specific portions of the eye area. For example, the light sources 202A-B are shown in FIG. 2 to be directed at an upper portion and a lower portion of the eye, respectively, near the inside corner 208 of the eye. In some implementations, a single light source can be directed at the whole eye area or at a part of the eye area (such as, for example, at one eyelid or at the center of the eye). As another example, several light sources can each aim at respective various points on the eye area, illuminating the eye at each of the various points. Light sources can also differ in the amount of the eye area to which they provide light (termed a spot size). For example, one light source can have a spot size that provides light to the entire eye area. Another light source can focus on a relatively small point on the eye. Further, the shape of the illuminated area can influence the behavior of the system. For example, if a light source illuminates a narrow horizontal area across the top of the eye area, the amount of reflected light can depend on whether the upper eyelid covers that particular height. As another example, a light source that provides light to the entire eye area can allow a system to detect the difference between a completely closed eye and an eye that is almost completely closed.

Additionally, each of the light sources can use modulated or pulsed light to distinguish the respective light source from other sources and from ambient light. In particular, each light source can be configured to pulse at a particular pattern so that the sensor can determine which source sent the light based on the on/off pattern of the light. Because ambient light typically does not follow any such pattern, the light from the system's light sources can be distinguished from ambient-light noise by processing the measured light signal. Note that other light characteristics can be used to distinguish between light sources and/or ambient light including, for example, frequency (color) and/or intensity of the light.

Further, the light sources can include elements that allow the system to dynamically change the frequency, intensity, spot size/shape, focus, and/or modulation of the generated light. In addition, the light sources can couple with one or more mechanical actuators or servos to facilitate changing their position and/or light direction. In this way, the system can allow for dynamic calibration and adjustments of the light sources.

ii. Light Sensor

In addition to the light sources 202A-B, the wink-detection system 200 includes a light sensor 206 that is configured to detect the light reflected from the eye area 204. As used in this disclosure, the term "reflected" can refer to a variety of interactions between light and an eye area, including those interactions that direct the light toward a light sensor. Examples of such interactions include mirror-reflection, diffuse reflection, and refraction, among other scattering processes. The sensor can be any type of light-sensitive element or device that is capable of outputting a measurable change in response to changes in light intensity. For instance, the sensor can be a photodiode, an electro-optical sensor, a fiber-optic sensor, a photo-detector, or a combination thereof, among other examples. Further, the sensor can be configured to detect a specified frequency of light or a specified range of frequencies. In some implementations, the sensitivity of the sensor can be designed for specified frequencies and intensities of light.

The sensor can be positioned to detect light reflected from particular portions of the eye area. For example, the sensor can be positioned above the eye to detect light reflecting from the top of the eye when they eye is open, and from the upper eyelid when the eye is closed. In this way, the sensor can detect the amount of the eye that the upper eyelid covers. In some embodiments, the light sensor can be positioned in use at an oblique angle with respect to the eye area (such as, for example, the orientation of the sensor 140 shown in FIG. 1B). In some arrangements, the sensor can point directly at the eye area and can aim toward the center of the eye area.

In some arrangements, the system can detect light reflected from a second eye area. For example, the system can receive light data from another light sensor that can detect light from the second eye area. Alternatively, one light sensor can be positioned to detect light from both eye areas.

Further, the system can be capable of adjusting and calibrating the behavior of the sensor such as, for example, by changing the position, direction, frequency response, sensitivity, detectable area, size/shape of the sensor, or combinations thereof. This can be done based on the context in which the system is used—for example, whether the system is calibrated to a particular user, an intensity of ambient light, the light sources used, a battery-level of the device, or the like. For example, the sensor can be coupled to mechanical actuators, which can be operable to change its position and direction. As another example, the sensor can include changeable filters and baffles for filtering out different frequencies of light.

A sensor that detects light from multiple sources can differentiate the signals from each source. For example, if the system uses a different pulsing pattern for each light source, then the sensor can separate signals based on the detected pulsing characteristics of detected light. Additionally, the light sources can alternate when they illuminate the eye area. In such an arrangement, the sensor can associate a measurement of light with a source based on which source was on at the time that the light was measured. If the light sources illuminate different sections of the eye area, then the separate signals can be further associated with the respective eye area portions. In other arrangements, the sensor can measure a single light intensity based on light from all the sources, without differentiating between the light sources.

iii. Processing and Other Elements

The processing unit in the wink-detection system can be a general-purpose processor, a specialized processor, or a network of general and/or specialized processors. The processing unit can be integrated with the light sensor or sources, or the processing unit can connect to the light sensor and sources through a bus or network connection. Further, the processing unit can include or connect to a non-transitory computer-readable medium, such as a hard disk, a memory core, a memory drive, a server system, or combinations thereof, among various other types of disks. This computer-readable medium can store program instructions for directing the processing unit to execute functions associated with a wink-detection method, such as, for example, one or more of the methods discussed in this disclosure.

The wink-detection system can include various other elements, including, for instance, additional processing, sensing, lighting, and/or interface elements. Some wink-detection systems can include a motion sensor (a gyroscope or an accelerometer, for example) to detect when the system moves. This can help the wink-detection system to determine whether a change in detected light can be due to a movement of the light sensor with respect to the eye area, as opposed to a movement of the eyes or eyelids with respect to the eye area.

In some implementations, the wink-detection system can be integrated in or with a computing system, such as the computing system described above with respect to FIGS. 1A-D. Such systems can help a user to interface with the wink-detection system, for instance, to specify user-preferences, change system settings, and/or perform calibration processes. Computing systems can also provide various other benefits for a wink-detection system, some of which are discussed in this section.

Figure 3:
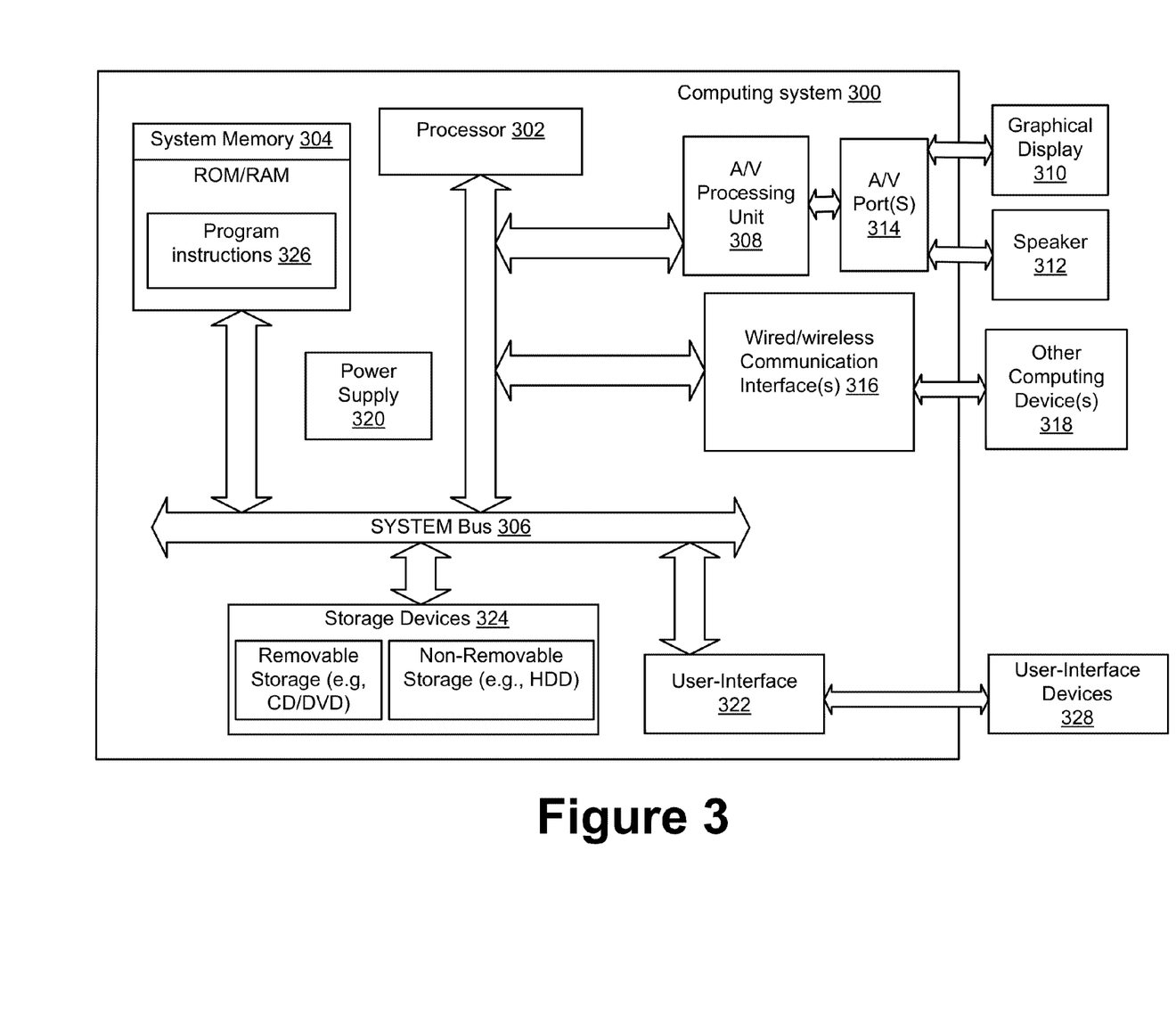
FIG. 3 illustrates an example of a computing system.

FIG. 3 illustrates an example of a computing system 300. The computing system 300 can include at least one processor 302 and system memory 304. The computing system 300 can include a system bus 306 that communicatively connects the processor 302 and the system memory 304, as well as other components of the computing system 300. Depending on the desired configuration, the processor 302 can be any type of processor including, but not limited to, a microprocessor (µP), a microcontroller (µC), a digital signal processor (DSP), or any combination thereof. Furthermore, the system memory 304 can be of any type of memory now known or later developed, including, but not limited to, volatile memory (such as RAM), non-volatile memory (such as ROM, flash memory, etc.) or any combination thereof.

The computing system 300 can include various other components as well. For example, the computing system 300 includes an A/V processing unit 308 for controlling the graphical display 310 and the speaker 312 (by way of the A/V port 314), one or more communication interfaces 316 for connecting to other computing devices 318, and a power supply 320. The graphical display 310 can be arranged to provide a visual depiction of various input regions provided by the user-interface 322. Note, also, that the user-interface 322 can be compatible with one or more additional user-interface devices 328 as well.

Furthermore, the computing system 300 can also include one or more data storage devices 324, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media The computing system 300 can communicate using a communication link 316 (a wired or wireless connection) to a remote device 318. The remote device 318 can be any type of computing device or transmitter, such as, for example, a laptop computer, a mobile telephone, or tablet-computing device, that can be configured to transmit data to the computing system 300. The remote device 318 and the computing system 300 can contain hardware to enable the communication link 316. Examples of suitable hardware include processors, transmitters, receivers, and antennas.

In FIG. 3, the communication link 316 is illustrated as a wireless connection; however, wired connections can also be used. For example, the communication link 316 can be a wired serial bus such as a universal serial bus or a parallel bus, among other connections. The communication link 316 can also be a wireless connection using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection can be a proprietary connection as well. The remote device 330 can be accessible by way of the Internet and can include a computing cluster associated with a particular web service (such as, for example, social-networking, photo sharing, an address book, or the like).

3. Operation

Figure 4:
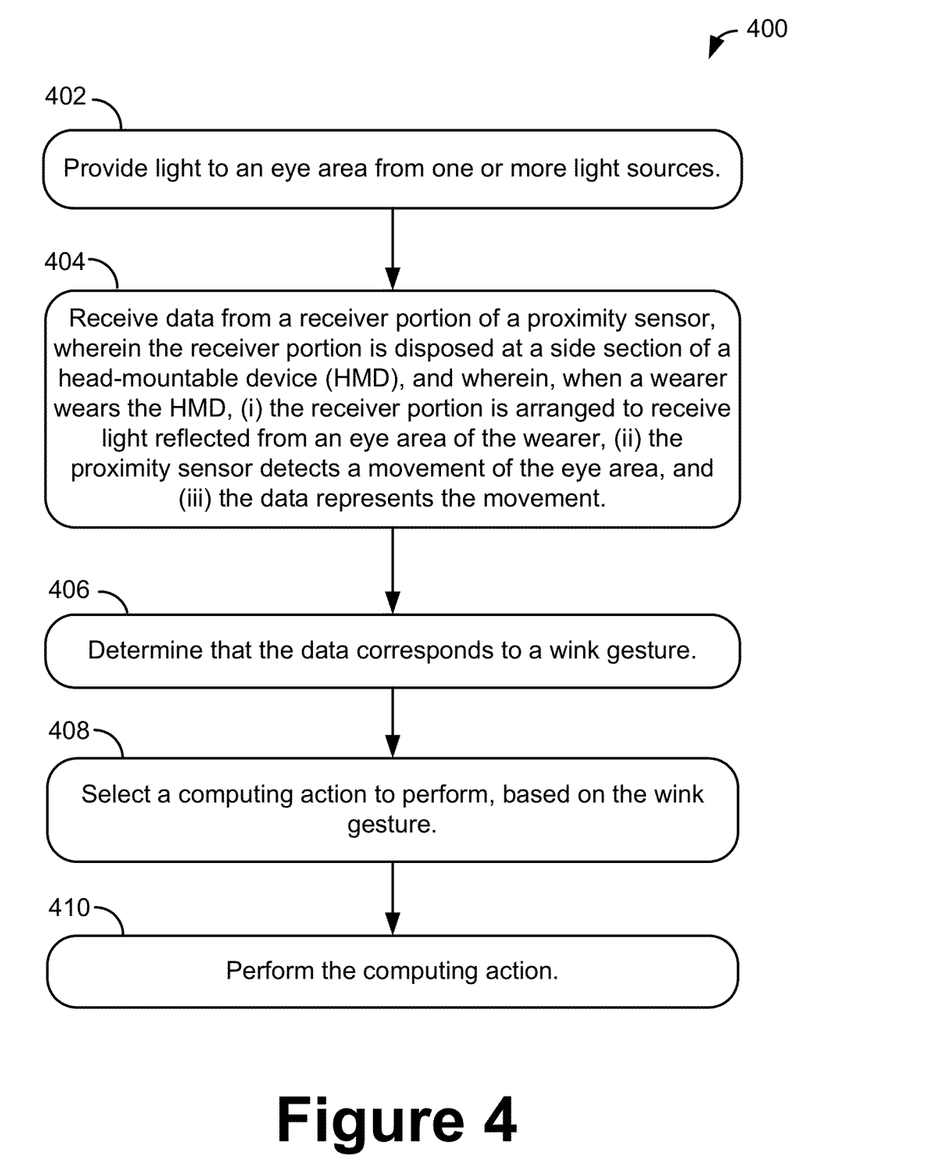
FIG. 4 is a flow chart illustrating a method, according to an embodiment.

FIG. 4 is a flow chart illustrating a method 400, according to an embodiment. At block 402, the method 400 involves providing light to an eye area from one or more light sources. At block 404, the method 400 involves receiving data from a receiver portion of a proximity sensor. The receiver portion can be disposed at a side section of a head-mountable device (HMD). When a wearer wears the HMD, the receiver portion is arranged to receive light reflected from an eye area of the wearer, the proximity sensor detects a movement of the eye area, and the data represents the movement. At block 406, the method 400 involves determining that the data corresponds to a wink gesture. At block 408, the method 400 involves selecting a computing action to perform, based on the wink gesture. And at block 410, the method 400 involves performing the computing action. Some implementations of the method 400 may not involve one or both of steps 402 and 410. Other implementations can involve alternative and/or additional steps.

a. Providing Light to an Eye Area

As discussed above, a wink-detection system can include one or more light sources. These light sources can be controlled by a light sensor or by a processing unit. When in use, the light sources can provide light to portions of an eye area. The eye area can include the wearer's eye surface, eyelids, and the portions of the face around the eye. The light sources can provide light to some or all of the eye area. As used in this disclosure, the term "light source" can include any device or set of devices that is configured to provide suitable electromagnetic (EM) radiation. The EM radiation can be visible light, or the EM radiation can be a suitable type of EM radiation that is outside the range of frequencies normally visible to humans. For example, some implementations can use one or more infrared light sources. Thus, as used in this disclosure, the term "light" can include both EM radiation that is in the visible range of frequencies and EM radiation that is outside the visible range of frequencies, depending on the desired implementation and the context in which the term "light" is used.

At block 402, the method 400 involves the system providing light to the eye area from one or more light sources. The light sources can constantly provide light to portions of the eye, or they can provide light to the eye intermittently. For example, the sources can alternate being on and off to facilitate distinguishing between the signals from each light source. Further, the on/off characteristics can help a sensor to differentiate between ambient light and artificial light signals. In some embodiments, a system can include both always-on and intermittent light sources.

Because facial structures generally differ from wearer to wearer, some systems can calibrate the direction, position, and spot size/shape characteristics of the light sources based on detected facial characteristics. For example, a system can determine the direction from the light sources to the center of an eye area (using, for example, gaze tracking, glint detection, video recognition, or combinations thereof) and then change the arrangement of light sources to aim at the area around the center.

b. Receiving Light Data from a Light Sensor

At block 404, the method 400 involves the system receiving light data from a receiver portion of a proximity sensor. The receiver portion can be disposed at a side section of an HMD. When a wearer wears the HMD, the receiver portion is arranged to receive light reflected from an eye area of the wearer, the proximity sensor detects a movement of the eye area, and the data represents the movement. For example, with reference to FIGS. 1A and 1B, when the HMD 102 is worn, the sensor 140 faces an eye area of the wearer and can detect a movement of the eye area.

In some implementations, the light data can indicate one or more characteristics of light reflected from the eye area. The sensor can be configured to detect certain aspects of the light, such as frequency and intensity of the light. Other aspects can also be detected, such as polarization, coherence, phase, spectral width, and/or modulation of the detected light.

The light sensor can also be arranged to detect light reflected from a particular portion of the eye area or to detect light from the entire eye area. Additionally, the sensor can be designed to detect light with certain attributes, such as, for example, a certain frequency of modulation, a frequency of light, or light with a particular polarization.

Further, the system can calibrate and adjust the characteristics of the sensor. For example, if the sensor is used with near-IR light sources, the sensor can be configured to filter light that is not in the near-IR frequency range in order to avoid a noisy signal. As another example, if a wink-detection system is mounted high above the eye area, the system can detect the position of the eye and responsively aim the sensor lower to capture the eye area. As another example, in response to detecting that the light sources are not as bright as desired, the system can increase the sensitivity of the sensor to compensate for the lower light intensity.

The light data provided by the sensor can be received as discrete light-intensity measurements over time. Also, light data can represent one combined signal from all light sources and eye-area portions, or the data can include multiple data-sets with each data-set representing a particular light source or detected portion of the eye area.

The intensity of light detected from a portion of the eye can change based on the characteristics of the eye at the specified point. In particular, a sensor can detect more light when the sensor is aimed at the skin surrounding the eye (including the eyelids) than the sensor detects when the sensor is aimed at the surface (the sclera, cornea, or the like) of the eye, because of, among other considerations, the different light-scattering characteristics of human skin and eye surfaces. Therefore, an increase in detected light from a particular portion of the eye area can be indicative of an eye movement that increases the amount of skin that occupies the portion of the eye area from which the sensor is detecting light. For example, a sensor that detects light from the surface of an eye when the eye is open (relatively less light) can also detect light from the eyelid when the eye is closed (relatively more light).

Figure 5:
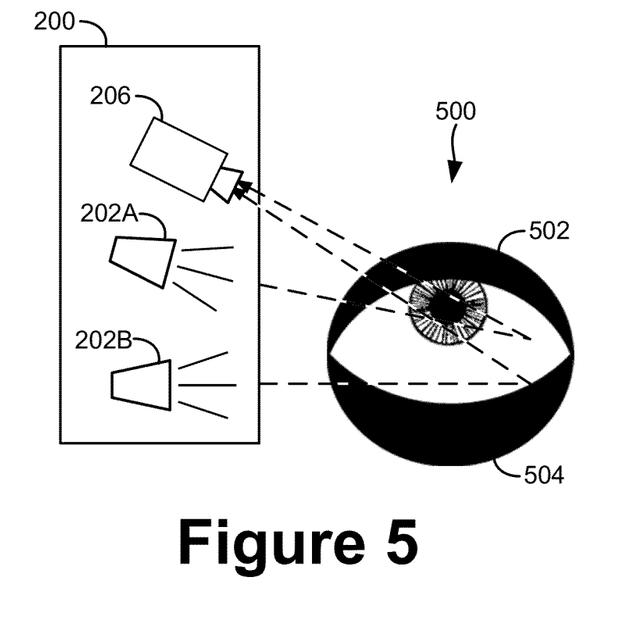
FIG. 5 illustrates the wink-detection system of FIG. 2, interacting with an upward-looking eye.

In addition to an eye closing, other eye movements can be represented by an increase in the light intensity detected by the sensor. For example, FIG. 5 shows the wink-detection system 200 illustrated in FIG. 2, in a situation in which the system 200 is interacting with the eye area 500. As shown in FIG. 5, the eye is looking up. Accordingly, the bottom eyelid 504 has moved up into a path of the light from the light source 202B. The intensity of the light detected by the sensor 206 and provided from the light source 202B, therefore, can increase as a result of the eye movement, because more skin would be illuminated by the source than in the situation depicted in FIG. 2. Meanwhile, in this example, the light from the light source 202A would still illuminate the top of the eye, without illuminating the eyelid 502 as it does in the situation shown in FIG. 2. Hence, the intensity of light provided by the source 202B can remain unchanged, and the overall detected light intensity from both sources can therefore increase as a result of the eye movement.

Figure 6:
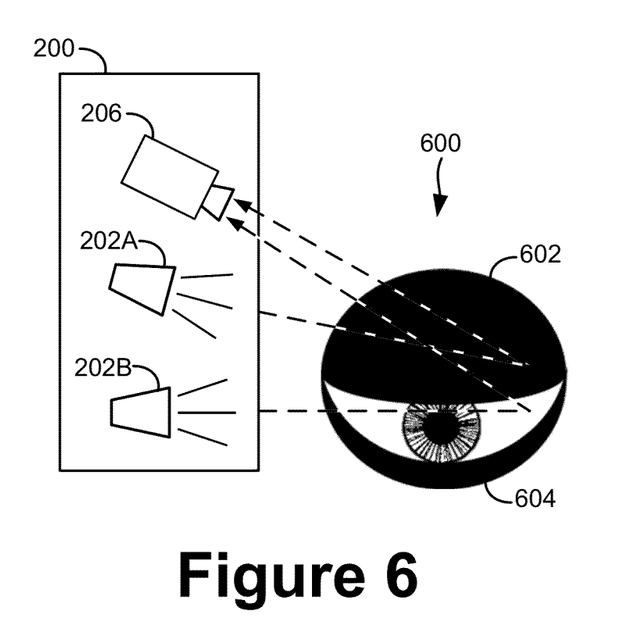
FIG. 6 illustrates the wink-detection system of FIG. 2, interacting with a downward-looking eye.

As another example, FIG. 6 shows the detection system 200 to be interacting with an eye area 600, in a situation in which the eye is looking down. As shown in FIG. 6, the wearer's top eyelid 602 has moved down and into the path of the light from the source 202A. The intensity of the light detected by the sensor 206 and provided from the light source 202A, therefore, can increase as a result of the eye movement, because more skin would be detected than in the situation depicted in FIG. 2. Meanwhile, the light from the source 202B still does not illuminate the top eyelid 602. Hence, the intensity of light detected from the source 202B would remain unchanged, and the overall detected light intensity from both sources can increase as a result of the eye movement.

c. Detecting a Wink Gesture

With reference to FIG. 4, the method 400, at block 406, further involves the system determining that the data from the proximity sensor corresponds to a wink gesture. Due to the scattering characteristics of the skin and eye surface, when the eye closes, the light detected by the wink-detection system can increase, as a result of an increase in the area of skin that is detected (or as a result of a decrease in the area of the eye that is detected). Therefore, an increase in light can be the result of a wink gesture.

Additionally, the characteristics of a light increase can indicate whether the corresponding eye movement is a wink or some other movement. For example, the size of an increase can indicate whether the eyes are partially closed (as in a squint) or fully closed (as in a wink). As another example, the movement of closing a single eye (wink) can be slower than the movement of closing both eyes (blink).

Figure 7A:
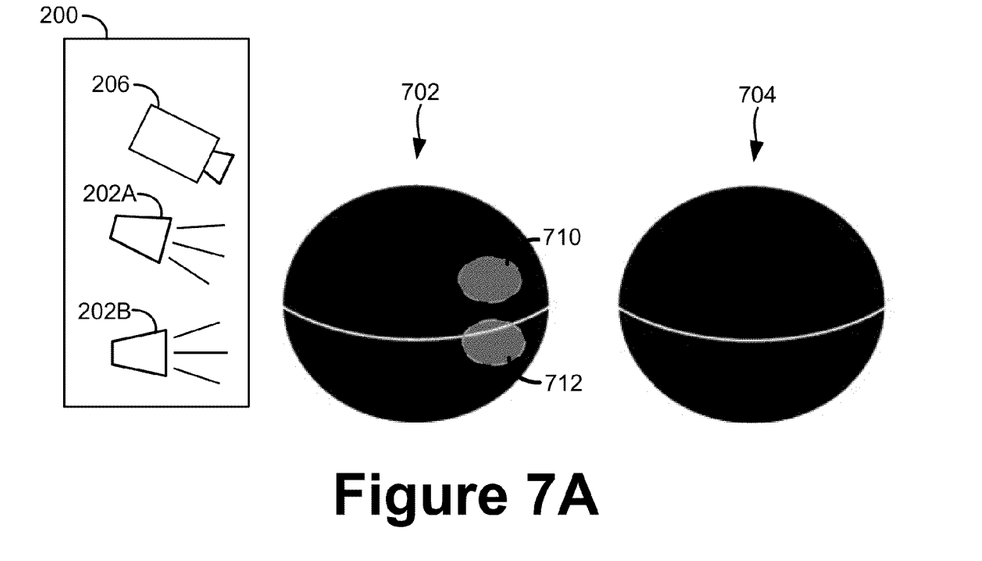
FIG. 7A illustrates the wink-detection system of FIG. 2, interacting with an eye area of a blinking wearer.
Figure 7B:
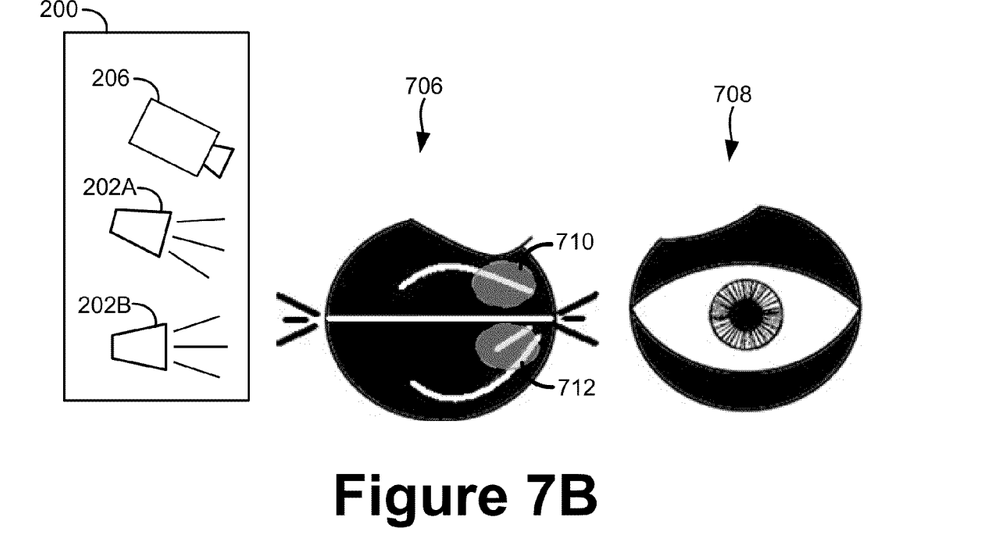
FIG. 7B illustrates the wink-detection system of FIG. 2, interacting with an eye area of a winking wearer.

More particularly, the increase in light that would result from a blink gesture can be smaller than the increase in light that would result from a wink gesture. For example, in a wink gesture, the eyelids and skin around the eye can wrinkle more than in a blink gesture. The resulting wrinkles can reflect more light to the sensor than the flat skin associated with a blink gesture would reflect. To illustrate, FIGS. 7A and 7B show the wink detection system 200 interacting with blinking eyes (FIG. 7A) and winking eyes (FIG. 7B). As shown, the blinking eyes 702 and 704 close relatively flatly, so that the light spots 710 and 712 illuminate flat eyelid skin on the eye 702. In contrast, the eyes 706 and 708 are involved in a winking gesture. Due to the winking gesture, the eyelid and skin surrounding eye 706 is flexed and wrinkled (wrinkles shown as solid lines). Therefore, the same illuminated spots 710 and 712 encounter folded and stressed skin on the eye 706. Hence, the light reflected from the winking eye 706 can be different from the light reflected by the blinking eye 702.

To distinguish between a wink and another eye movement, the wink-detection system can store data indicating the amount of light that reflects to a sensor as a result of a wink gesture, and data indicating the light intensity that results from other eye movements (such as a blink gesture, a squint gesture, or a change in gaze direction). Then, when an eye movement is detected, the system can compare the current light intensity to the stored data indicating the relative light intensities to determine whether the eye movement is the result of a wink gesture. The stored data can indicate the maximum or average amplitudes of light intensity associated with each eye movement. In some cases, the data can also indicate the time-based changes in light intensity that result from various eye movements. For example, because an eye can close slower in a wink than in a blink, the stored data can indicate a corresponding slower change in detected light intensity resulting from a wink gesture than from a blink gesture.

Further the system can use the duration of a wink, the eye-opening speed after the closure, changes in intensity while the eye is closed, or combination thereof as bases for determine that a particular change in light indicates a wink gesture.

Depending on the portions of the eye that are illuminated and measured, a wink can be detected in different ways. For example, in the system 200, the light from the top and bottom eyelids can be separately measured and increases in detected light can be recognized for each eyelid. In other arrangements, the movement of a single eyelid can be tracked, or the overall eye area can be measured.

d. Determining a Gaze Direction

In addition to detecting a wink gesture, the system can determine a gaze direction, representing the direction along which the eye is oriented while winking (and before/after the wink). In particular, the method 400 can involves determining a gaze direction, based on the wink gesture. The system can determine the gaze direction based on characteristics of the detected light before, during, and/or after a detected wink gesture.

As shown in the situations depicted in FIGS. 2, 5, and 6, the characteristics of the detected light can change based on the direction that the eye is looking before and/or after winking. For example, the light detected by the system 200 can increase as a result of an eye looking either up (as in FIG. 5) or down (as in FIG. 6). Hence, if the system 200 is configured to differentiate between the signals from source 202A and the signals from source 202B, the increases in light intensity from each source can be associated with corresponding eye movements.

To facilitate associating light-intensity data with eye-movement information, the system can collect and store representative light-intensity data for known eye movements. For example, the system can be programmed with characteristic light-intensity levels that correspond with a particular gaze direction. Alternatively, user-specific data can be gathered. For instance, a wearer can be instructed to follow a calibration procedure to store particular intensity data associated with the particular wearer's facial characteristics. In particular, the system can prompt the wearer to look in different directions such as, for example, by audio or text commands, or by displaying an indicator in the direction that the wearer should be looking, and then the system can store the intensity of light that is detected from the wearer's eye area while the wearer is looking in the different directions.

Further, the system can adjust the representative light-intensity levels to better match the associated gaze directions. In particular, if the system determines that a representative level does not correctly represent the light that can be detected when the eye is oriented along the associated gaze direction, then the system can responsively adjust the representative level to a level that does represent the light that can be detected when the eye is oriented along the gaze direction. For example, if the system detects that the most common detected light-intensity level (likely associated with a wearer looking straight ahead) is much lower than the recorded intensity level associated with the straight ahead gaze direction, the system can responsively lower the representative level to match the previous readings.

In addition, the system can calibrate the stored list of light-intensity levels for a particular context in which the method is used. For example, a system that is used by multiple users can store representative light-intensity levels for each user. When the user changes, the system can responsively change the list of levels that it uses.

The system can then compare light-intensity levels before and/or after the wink gesture to the characteristic or recorded readings. By matching the detected intensity level(s) to representative levels, the system can determine a possible gaze direction at the time of the wink.

Additionally, the system can store characteristic or user-specific light-intensity data related to gaze directions with an eye in a closed state (for example, with the eye winking). Then, the intensity level detected during a wink can be compared to the stored eye-closed intensity levels. In this way, the gaze direction can be determined by the light data received during the wink in addition to the light data received before and after the wink.

In some implementations, the system can determine a gaze direction without referring to a list of representative data. For example, if the wink gesture occurs while the eye is looking forward, the difference between the light-intensity level before the wink gesture and the light-intensity level during the wink gesture can be much larger than if the wearer were looking either up or down. Therefore, the system can determine a first light-intensity level associated with an eye-open state and a second light-intensity level associated with an eye-closed state. Further, the system can determine that the difference in light-intensity is greater than a non-zero threshold difference and, based on this determination, determining that the gaze direction is an intermediate vertical direction (between an upward and a downward direction). Similarly, the system can determining that the gaze direction is one of an upward and a downward direction, in response to determining that the difference in light-intensity is not greater than a non-zero threshold. Similar procedures can be used for comparing the intensity during a wink to the intensity after the wink.

e. Selecting a Computing Action to Perform

At block 408, the method 400 involves selecting a computing action to perform, based on the wink gesture. At block 410, the method 400 can involve a computing system of the HMD to perform the computing action, or sending a command to cause another computing system to perform the computing action. In some implementations, the system can select different actions to perform, depending on certain characteristics of the wink gesture. For example, the system can refrain from selecting a given computing action in response to detecting a wink with certain characteristics, and select the computing action in response to detecting a wink with other characteristics. In particular, the system can select one or more computing actions to be performed, based on the wink gesture and then perform the selected action.

As a particular example, a system can select a particular action in response to a wink in which the eye is oriented along a certain direction. In particular, the system can make a determination that the gaze direction is one of a predetermined set of directions and responsively determine the action to be performed based on the determination. For example, the system can store a range of directions that are "on screen" and a range of directions that are "off screen". When the wearer is looking relatively forward (for example, towards an intermediate vertical direction, as shown in FIG. 2) when winking, then the system can recognize the wink gesture as on-screen winking and responsively select a computing action to be performed. In contrast, when the wearer is looking upward or downward while winking, then the system can recognize the wink gesture as off-screen winking and responsively refrain from selecting the computing action.

In some implementations, the system can select different computing actions in response to one or more winks in which the wearer is looking at different directions. For example, the system can select one action in response to an on-screen wink and another action in response to an off-screen wink. As another example, the system can set several direction ranges associated with various different actions and then select the actions in response to the wearer looking in each respective direction range. Accordingly, the system can first determine an action to perform in response to a detected wink and then perform the determined action. A system can also condition performance of a specified action on other characteristics of a winking motion or other contexts.

The computing action can be any function that is executable by the wink-detection system or by an attached computing system. For example, the computing action can involve causing an image capture device to capture image data. In an implementation, the image capture device can be, for example, a camera, such as a front-facing camera, of the HMD. In another implementation, the image capture device can be a camera that is separate from the HMD and in communication with the HMD. Other examples of computing actions include (1) activating, deactivating, or modifying an interface, such as a voice command interface of the HMD; (2) detecting a face in an image; (3) detecting an object in an image; (4) recording a video using a camera of the HMD; (5) displaying a video using a display of the HMD; (6) sending an image as an e-mail; (7) sending an image to a social network; (8) sending information to another device, such as a mobile phone or another HMD; (9) activating or de-activating the HMD itself; (10) activating or de-activating a display of an HMD; (11) modifying information provided in a display of an HMD; (12) using an HMD to activate, deactivate, or modify an external device, such as an external camera or display; and (13) any combination of these or other types of computing actions.

The computing action can be a select function that is similar to a function that a computer executes in response to detecting a mouse click. As another example, a system can perform a function associated with an application running on the device in response to detecting winking. In some cases, multiple computing actions can be performed in response to detecting a wink. Various other functions can be selected and/or performed in response to detecting a wink.

4. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   receiving data from a receiver portion of a proximity sensor, wherein the receiver portion is disposed at a side section of a head-mountable device (HMD), and wherein, when a wearer wears the HMD, (i) the receiver portion is arranged to receive light reflected from an eye area of the wearer, wherein the eye area includes a skin area to a side of an eye that wrinkles during a wink, (ii) the proximity sensor detects a movement of the eye area, and (iii) the data represents the movement;
   determining that the data corresponds to a wink gesture, wherein the determining step comprises:
      determining a light intensity level at the receiver portion; and
      determining that the light intensity level corresponds, at least in part, to wrinkles in the skin area that are characteristic of a wink;
   selecting a computing action to perform, based on the wink gesture; and
   performing the computing action.

2. The method of claim 1, further comprising determining a gaze direction, based on the data.

3. The method of claim 2, wherein the determining the gaze direction comprises:
   determining a first light intensity level and a second light intensity level, based on the data, wherein the first light intensity level corresponds to an eye-open state, and wherein the second light intensity level corresponds to an eye-closed state;
   determining whether a difference between the first light intensity level and the second light intensity level exceeds a threshold; and
   based on a determination that the difference exceeds the threshold, determining that the gaze direction is an intermediate vertical direction.

4. The method of claim 2, wherein the determining the gaze direction comprises:
   determining a first light intensity level and a second light intensity level, based on the data, wherein the first light intensity level corresponds to an eye-open state, and wherein the second light intensity level corresponds to an eye-closed state;
   determining whether a difference between the first light intensity level and the second light intensity level does not exceed a threshold; and
   based on a determination that the difference does not exceed the threshold, determining that the gaze direction is either an upward direction or a downward direction.

5. The method of claim 2, further comprising:
   storing a plurality of light intensity levels for an eye-open state, wherein each light intensity level in the plurality is associated with a corresponding gaze direction; and
   performing a calibration of the plurality of light intensity levels for a context in which the method is used.

6. The method of claim 2, wherein the selecting the computing action to perform is further based on the gaze direction.

7. The method of claim 2, further comprising determining whether the gaze direction corresponds to at least one of a predetermined set of directions, wherein the selecting the computing action to perform is further based on a determination that the gaze direction corresponds to the at least one of the predetermined set of directions.

8. The method of claim 1, further comprising causing infrared light having a predetermined characteristic to be provided to the eye area, wherein the data indicates the predetermined characteristic.

9. The method of claim 1, wherein the computing action comprises causing an image capture device to capture image data.

10. A head-mountable device (HMD) comprising:
    a support structure comprising a front section and a side section, wherein the side section is adapted to receive a receiver portion of a proximity sensor such that, when a wearer wears the HMD, (i) the receiver portion is arranged to receive light reflected from an eye area of the wearer, wherein the eye area includes a skin area to a side of an eye that wrinkles during a wink, and (ii) the proximity sensor is configured to detect a movement of the eye area;
    a computer-readable medium; and
    program instructions stored to the computer-readable medium and executable by at least one processor to perform functions comprising:
       receiving data from the receiver portion, wherein, when the HMD is worn, the data represents the movement of the eye area;
       determining that the data corresponds to a wink gesture, wherein the determining step comprises:
          determining a light intensity level at the receiver portion; and
          determining that the light intensity level corresponds, at least in part, to wrinkles in the skin area that are characteristic of a wink;
       selecting a computing action to perform, based on the wink gesture; and
       performing the computing action.

11. The HMD of claim 10, further comprising the proximity sensor.

12. The HMD of claim 10, wherein the side section is further adapted to receive the receiver portion of the proximity sensor such that, when the wearer wears the HMD, the receiver portion is positioned at an oblique angle with respect to the eye.

13. The HMD of claim 10, further comprising a light source, wherein when the wearer wears the HMD, the light source is adapted to provide light to the eye area.

14. The HMD of claim 13, wherein when the wearer wears the HMD, the light source is adapted to provide light to both of an upper-eyelid area of the eye area and a lower-eyelid area of the eye area, and wherein the data represents at least one characteristic of one or both of light reflected from the upper-eyelid area and light reflected from the lower-eyelid area.

15. The HMD of claim 13, wherein the light is infrared light.

16. The HMD of claim 10, wherein the functions further comprise determining a gaze direction, based on the data.

17. The HMD of claim 10, wherein the functions further comprise causing infrared light having a predetermined characteristic to be provided to the eye area, wherein the data indicates the predetermined characteristic.

18. The HMD of claim 10, wherein the skin area to the side of the eye wrinkles less or does not wrinkle during a blink, and wherein the HMD further comprises program instructions stored on the computer-readable medium and executable by at least one processor to perform functions comprising:
   determining that the light intensity level instead corresponds, at least in part, to light reflected from the skin area to the side of the eye during a blink.

19. A non-transitory computer-readable medium having stored thereon program instructions that, upon execution by at least one processor, cause the at least one processor to perform functions comprising:
   receiving data from a receiver portion of a proximity sensor, wherein the receiver portion is disposed at a side section of a head-mountable device (HMD), and wherein, when a wearer wears the HMD, (i) the receiver portion is arranged to receive light reflected from an eye area of the wearer, wherein the eye area includes a skin area to a side of an eye that wrinkles during a wink, (ii) the proximity sensor detects a movement of the eye area, and (iii) the data represents the movement;
   determining that the data corresponds to a wink gesture, wherein the determining step comprises:
      determining a light intensity level at the receiver portion; and
      determining that the light intensity level corresponds, at least in part, to wrinkles in the skin area that are characteristic of a wink;
   determining a gaze direction, based on the data;
   selecting a computing action to perform, based on one or both of the wink gesture and the gaze direction; and
   performing the computing action.

20. The non-transitory computer-readable medium of claim 19, wherein the determining the gaze direction comprises:
   determining a first light intensity level and a second light intensity level, based on the data, wherein the first light intensity level corresponds to an eye-open state, and wherein the second light intensity level corresponds to an eye-closed state;
   determining whether a difference between the first light intensity level and the second light intensity level exceeds a threshold; and
   based on a determination that the difference between the first light intensity level and the second light intensity level exceeds the threshold, determining that the gaze direction is an intermediate vertical direction.

21. The non-transitory computer-readable medium of claim 19, wherein the determining the gaze direction comprises:
   determining a first light intensity level and a second light intensity level, based on the data, wherein the first light intensity level corresponds to an eye-open state, and wherein the second light intensity level corresponds to an eye-closed state;
   determining whether a difference between the first light intensity level and the second light intensity level does not exceed a threshold; and
   based on a determination that the difference between the first light intensity level and the second light intensity level does not exceed the threshold, determining that the gaze direction is either an upward direction or a downward direction.

22. The non-transitory computer-readable medium of claim 19, wherein the functions further comprise determining whether the gaze direction corresponds to at least one of a predetermined set of directions, wherein the selecting the computing action to perform is further based on a determination that the gaze direction corresponds to the at least one of the predetermined set of directions.

23. The non-transitory computer-readable medium of claim 19, wherein the functions further comprise causing infrared light having a predetermined characteristic to be provided to the eye area, wherein the data indicates the predetermined characteristic.

* * * * *